Patented Apr. 14, 1942

2,279,293

UNITED STATES PATENT OFFICE 2,279,293

COPOLYMERS OF BUTADIENES WITH UNSATURATED ALCOHOL ESTERS OF ACRYLIC ACIDS

Albert M. Clifford, Stow, Ohio, assignor to Wingfoot Corporation, Wilmington, Del., a corporation of Delaware No Drawing. Application March 31, 1938, Serial No. 199,184

5 Claims. (Cl. 260—84)

This invention relates to artificial rubber-like masses of improved characteristics and to methods of preparing the same.

Heretofore, materials having some of the properties of rubber have been prepared by polymerization of a mixture of butadiene and another unsaturated compound but the materials so prepared do not possess, to as high a degree as desirable, the properties of tackiness and elasticity. The present invention contemplates the preparation of co-polymers which possess these properties in a greater degree than co-polymers at present available.

In its simplest aspect, the invention concerns the preparation of co-polymers of butadiene type hydrocarbons, or 1:3 dienes, with certain esters of acrylic acids. The butadienes employed may be represented by the formula

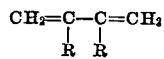

R being hydrogen or a hydrocarbon radical which is preferably an alkyl radical but may be an aryl radical; and the esters of acrylic acids may be represented by the formula

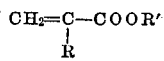

where R is hydrogen or an alkyl group, preferably, but may be aralkyl or aryl or any one of various other substituents, and R' is preferably a saturated aliphatic radical of four or more carbon atoms containing a branched chain or an unsaturated aliphatic radical, but may be an aralkyl radical or an aryl radical.

In preparing the co-polymers, a butadiene and an ester of an acrylic acid are mixed and heated together. Fundamentally, heating at a moderate temperature for a long enough period to complete the polymerization is all that is necessary but, in practice, it is preferred to form an emulsion of the monomers, as the materials are termed before polymerization, and to conduct the polymerization in the presence of suitable catalysts, promoters and modifiers. The monomers may be mixed in various proportions but, generally, from 25–75% of the total weight of the two constituents will be constituted by the ester of the acrylic acid.

A temperature in the neighborhood of 50° C. may be employed for the polymerization and this temperature maintained until polymerization is complete, a matter of 100–300 hours. Of course, this temperature may be raised or lowered somewhat, effective polymerization taking place at room temperature and a temperature as high as 80° C. being employed in some instances. Air may be excluded during the polymerization but pressure is not necessary to the reaction, although, depending on the monomers used, pressure will develop according to the vapor pressures of the monomers at a given temperature.

Among the 1:3 dienes which may be employed as one constituent of the polymerizable mixtures are 1:3 butadiene, $CH_2=CH-CH=CH_2$, methyl butadiene or isoprene,

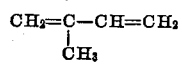

dimethyl butadiene and other compounds containing the characteristic butadiene linkage $C=C-C=C$.

The esters of the acrylic acids which may be employed as the other monomeric constituent of the polymerizable mixture are numerous and may be generally characterized as esters of acrylic acids in which the ester group is a saturated aliphatic group having at least four carbon atoms and containing a branched chain; such as isobutyl acrylate, secondary butyl acrylate, isoamyl acrylate, the esters of the various branched chain isomers of the hexyl radical, e. g., 2-methyl and 3-methyl amyl, 2-2-dimethyl butyl and 2-3-dimethyl butyl, the various heptyl esters which may be derived from the seven-carbon branched chain isomers of this radical, the branched chain octyl esters, particularly 2:ethyl hexyl ester of acrylic acid, etc. The aliphatic group may, of course, be substituted by an aromatic nucleus to yield aralkyl esters, such as the benzyl ester of acrylic acid.

There may also be used the esters of substituted acrylic acids corresponding to those of acrylic acid itself as set forth above. The substituent should be on the carbon atom alpha to the carboxyl group in order to leave a terminal methylene group in the acid. Thus, among others, methacrylic acid,

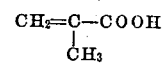

and the corresponding ethyl, propyl, isopropyl, butyl and isobutyl acrylic acids form esters which may be co-polymerized with the butadiene compound, the ester-forming radical being any one of those mentioned above, such as isobutyl, secondary butyl, isoamyl, etc. Examples of these esters are isobutyl methacrylate, isoamyl methacrylate, 2-ethyl hexyl methacrylate, isoamyl ethacrylate, isobutyl propacrylate, etc.

The esters of acrylic acids formed by groups having a branched chain of four or more carbon atoms, such as the isoalkyl and secondary alkyl groups, e. g., isobutyl, secondary butyl, isoamyl and 2-ethyl hexyl, are preferred because they tend to give products, when co-polymerized with a butadiene, which possess the valuable properties of tackiness and improved elasticity to a greater degree than the lower or simpler esters. The co-polymers of the present invention possess these characteristics to a much higher degree than do the co-polymers of butadiene-styrene and butadiene acrylic nitrile, which are somewhat lacking in these valuable properties.

The esters of an acrylic acid in which the ester-forming group is unsaturated may also be employed, the ester group being an unsaturated aliphatic group which may, however, contain an aromatic substituent. Among such esters are those of vinyl, allyl, methallyl, butadienyl, i. e.,

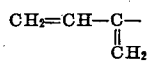

styryl, $C_6H_5.CH=CH-$, and the various isomers of these unsaturated radicals and other radicals of similar type. As in the case of the saturated aliphatic esters, from these unsaturated radicals may be derived esters of acrylic acid itself or of the alpha-substituted acrylic acids, such as methacrylic, ethacrylic, etc. Examples are allyl methacrylate, methallyl methacrylate, allyl acrylate, methallyl acrylate, styryl acrylate, styryl ethacrylate.

In certain cases, the requirement that the terminal methylene group shall be present in the acrylic acid ester may be dispensed with provided the substituent on the carbon atom alpha to the carboxyl group contains a 1:3 diene linkage or makes up such a linkage with the double bond in the acrylic acid. Such an ester may be formed with furyl acrylic acid, the furyl nucleus containing two double bonds in 1:3 relationship. This furyl acrylic acid forms esters with any of the above-mentioned saturated or unsaturated aliphatic radicals or aromatic-substituted aliphatic radicals and such esters may be combined with a butadiene compound to form useful co-polymers.

Co-polymerization or interpolymerization of any of the above described acrylates with a butadiene-type hydrocarbon, i. e., those having the characteristic linkage $C=C-C=C$, in suitable proportions, has been found to yield tough, rubber-like polymers possessing high tensile strength and other valuable properties. The proportions in which the two monomers are present will vary depending on the particular acrylate employed, the proportions being taken so as to give a material having the most suitable properties for the purpose intended. Generally speaking, the most valuable co-polymers will be obtained when the percentage of acrylic acid ester present ranges from 25% to 75% of the total weight of monomer which is subjected to polymerization, or, conversely speaking, the butadiene used will vary from 75% to 25% of the whole.

The conditions under which polymerization is conducted may also be varied, moderate heating for a sufficient period of time to complete the reaction being the only essential. However, more efficient results are obtained by the use of appropriate catalysts, promoters and modifiers. As catalyst there may be used sodium perborate, hydrogen peroxide, metallic peroxides such as sodium peroxide, benzoyl peroxide and other organic peroxides; as promoters, or activators, carbon tetra chloride, chlorobenzene, chloroform, ethylene dichloride, hexa chloro ethane, chloro propionitrile, etc.; and as emulsifying agents, sodium oleate, sodium stearate, etc., and other soluble soaps, but not amine soaps, Aquarex D (a sodium sulfate ester of higher alcohols), Nekal, and other sodium sulfonates of alkylated naphthalenes, biphenyls, etc.

The following examples are illustrative of the invention but it is not intended to limit the same thereto.

*Example 1*

To 20 parts 3% aqueous sodium oleate containing 0.48 part $CCl_4$ and 0.133 part sodium perborate was added 9.6 parts 2-ethyl hexyl methacrylate. After proper cooling, 6.4 parts butadiene-1:3 was introduced and the glass bomb sealed. Polymerization was effected by agitating at 50° C. for 332 hours. A 97% yield of soft, very tacky polymer was obtained. This product possesses remarkably rubber-like properties and, in addition to being tough, possesses an inherent tackiness which has not characterized polymers of any type thus far obtained.

*Example 2*

To 20 parts of 3% aqueous sodium oleate were added 0.48 part $CCl_4$ and 0.133 part sodium perborate. To this emulsifying medium, when properly cooled, was added 4 parts allyl methacrylate, followed by the addition of 12 parts butadiene-1:3. The mixture was sealed in a glass bomb and agitated at 50° C. for 136 hours. A dry powder-like polymer was obtained in substantially quantitative yield. The type of polymer thus prepared from acrylates in which the ester group is unsaturated requires to be plasticized but they can be handled on a rubber mill to produce a desirable sheet. Most of the plasticizers customarily used with rubber may be employed, such as coal tar, pine tar, methyl phthalyl ethyl glycolate, wool grease, and dibenzyl naphthalene, etc. These plasticizers may be employed with any of the co-polymers herein described but their use is not a part of the present invention since they are included in the subject-matter of a separate application.

*Example 3*

In a manner similar to that in Example 2, 8 parts each of methallyl methacrylate and butadiene-1:3 were polymerized at 50° C. in 184 hours. The polymer, which was also soft and crumbly, was obtained in 91.2% yield. It could be sheeted on a hot mill, but handles better if plasticized.

In addition to the classes illustrated above, acrylates of an acrylic acid not containing a terminal methylene group but substituted in the beta position by a radical which modifies the terminal methyl group may be used, the acrylates or esters of this type co-polymerizing satisfactorily with butadienes as set forth in the following example.

*Example 4*

To 20 parts of aqueous 3% Aquarex D (a sodium sulfate ester of higher alcohols) containing 0.48 part $CCl_4$ and 0.133 part sodium perborate were added 4 parts methallyl furyl acrylate,

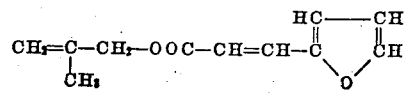

After proper cooling, 12 parts butadiene-1:3 were added and the glass bomb closed. Polymerization was conducted by agitation at room temperature for 184 hours. In this case a soft rubber-like mass was obtained.

The polymerized masses obtained in the foregoing examples, as well as others prepared by copolymerization of any of the butadienes mentioned herein with any of the acrylates set forth may be used in place of rubber for purposes where resistance to oils, heat, and other influences is of paramount importance. It will be apparent that the invention extends to other acrylates of the class described and to other 1:3 dienes or butadienes, interpolymerization taking place between various acrylic esters having a terminal $=CH_2$ group and the various butadienes which also contain conjugated linkages. Accordingly, it is intended that the patent shall cover, by suitable expression in the appended claims, all features of patentable novelty residing in the invention.

What I claim is:

1. Polymerization products substantially identical with those obtained by polymerizing a butadiene with an acrylic acid ester of an unsaturated aliphatic alcohol at a temperature between room temperature and 80° C.

2. Polymerization products substantially identical with those obtainable by polymerizing a hydrocarbon butadiene with an acrylic acid ester of an unsaturated aliphatic alcohol at a temperature between room temperature and 80° C.

3. Polymerization products substantially identical with those obtained by copolymerizing 1-3-butadiene and an acrylic acid ester of an unsaturated aliphatic alcohol at a temperature between room temperature and 50° C.

4. Polymerization products substantially identical with those obtainable by copolymerizing 1-3-butadiene with allyl methacrylate at a temperature in the neighborhood of 50° C.

5. Polymerization products substantially identical with those obtained by copolymerizing 1-3-butadiene and methallyl methacrylate at a temperature in the neighborhood of 50° C.

ALBERT M. CLIFFORD.